Figure 1:
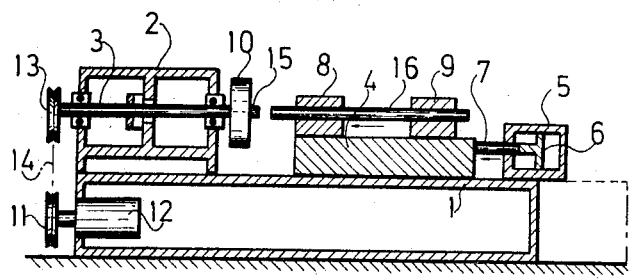

United States Patent [19]
Kuzuya et al.

[11] 3,711,009
[45] Jan. 16, 1973

[54] APPARATUS FOR OPTIONALLY SELECTING THE THRUST FORCE IN FRICTION WELDING

[75] Inventors: Takashi Kuzuya; Toshihiko Hayashi, both of Kariya; Shigeo Fukaya, Nishikamo, all of Japan

[73] Assignee: Kabushiki Kaisha Toyoda Jidoshokki Seisakusho, Kariya-shi, Japan

[22] Filed: Nov. 17, 1971

[21] Appl. No.: 199,440

Related U.S. Application Data

[63] Continuation of Ser. No. 798,428, Feb. 11, 1969, abandoned.

[30] Foreign Application Priority Data

Feb. 13, 1968 Japan..................................43/8962

[52] U.S. Cl. ........................228/2, 29/470.3, 156/73
[51] Int. Cl. .............................................B23k 27/00
[58] Field of Search ............228/2; 29/470.3; 156/73; 137/625

[56] References Cited

UNITED STATES PATENTS

| | | | |
|---|---|---|---|
| 3,635,388 | 1/1972 | Jenkinson et al.........................228/2 |
| 3,455,494 | 7/1969 | Stamm......................................228/2 |
| 3,451,121 | 6/1969 | Yocum...................................29/470.3 |

Primary Examiner—J. Spencer Overholser
Assistant Examiner—R. J. Craig
Attorney—Robert E. Burns et al.

[57] ABSTRACT

An improved apparatus for optionally selecting one of a plurality of thrust forces required for generating heat by the frictional contact between two workpieces for performing the upset operation during a friction welding operation. Two series of thrust force generating systems are combined in a hydraulic circuit which is connected to three hydraulic cylinders of the friction welder. One of the hydraulic cylinders is secured to a bed of the friction welder at an outside position of a slide table while the other two hydraulic cylinders are disposed at the counter side positions with respect to the slide table. In a typical embodiment, one of the thrust force generating systems is preferably applied for generating the thrust force which is required for operating the upset operation while the other one is applied for generating the thrust force which is required for generating heat. The above-mentioned combination of the thrust forces is optionally selected by operating means for selecting the system which comprises a plurality of solenoid selector valves, pressure reducing valves and their associated connections.

6 Claims, 7 Drawing Figures

THRUST FORCE

GAUGE PRESSURE OF THE PRESSURE OIL CIRCUIT 3,711,009

APPARATUS FOR OPTIONALLY SELECTING THE THRUST FORCE IN FRICTION WELDING

This is a continuation of application Ser. No. 798,428 filed Feb. 11, 1967, now abandoned.

The present invention relates to an apparatus for optionally selecting the thrust force applied to the workpieces during a friction welding operation, more particularly relates to an improved apparatus for optionally and alternatively selecting the thrust force which is suitable for generating heat by frictional contact of the workpieces or for carrying out an upset operation.

The above-mentioned thrust force which is suitable for generating heat, and for carrying out the upset operation, are hereinafter referred to as "the first thrust force" and "the second thrust force", respectively.

Attempts have been made in the past to optionally select the thrust force applied to the workpieces by means of two regulating valves disposed in a hydraulic circuit attached to the friction welder. In these instances, the fluid pressure is applied to a cylinder of the friction welder for pressing one workpiece to the other workpiece in such a way that the thrust force applied to the workpieces is proportional to the fluid pressure. However, only a single system of generating the thrust force is used in the conventional friction welder, in order to obtain a series of high thrust forces in the friction welder, therefore, it is very difficult to generate an accurate first thrust force in a domain of low thrust force of the above-mentioned system.

On the contrary, if the above-mentioned single system of generating thrust forces is exchanged with a system which generates a series of low thrust forces in the friction welder in order to raise the level of accuracy of the first thrust force, it is impossible to obtain the high thrust force which is always required to carry out the upset operation.

The object of the present invention is to provide an apparatus for optionally selecting a combination of the first thrust force and the second thrust force within a wide range and precise condition by selecting the actuation of a plurality of hydraulic cylinders mounted on the friction welder, thereby the above-mentioned drawbacks can be eliminated.

Figure 3:
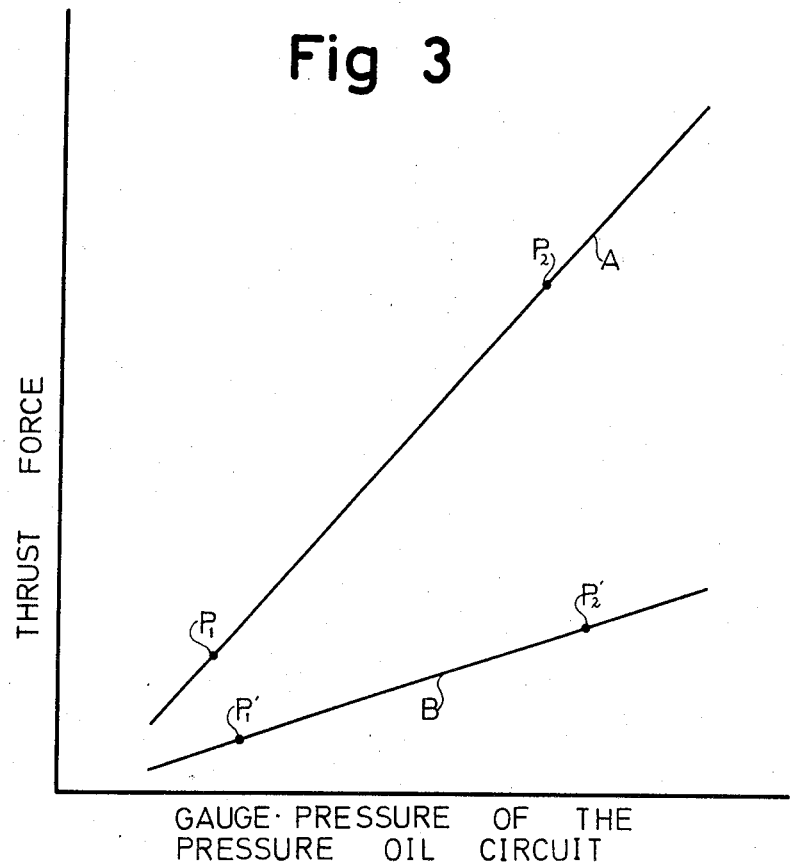
Figure 2:
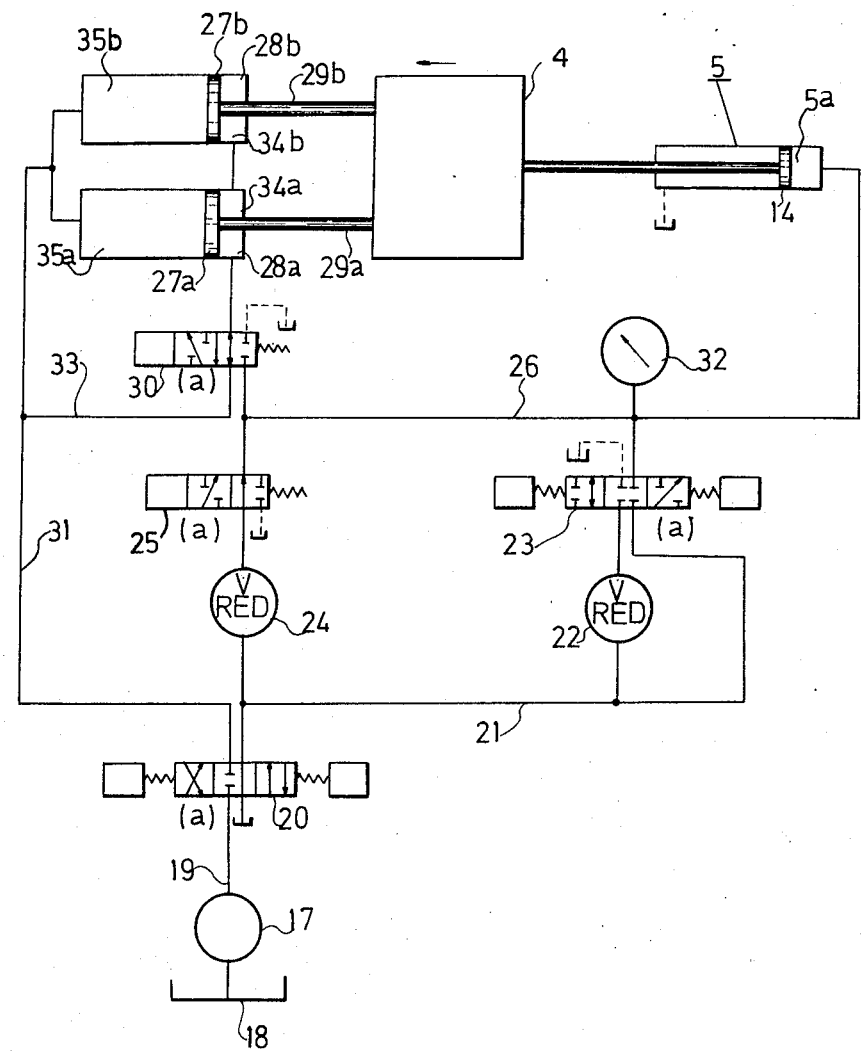
Figure 4A:
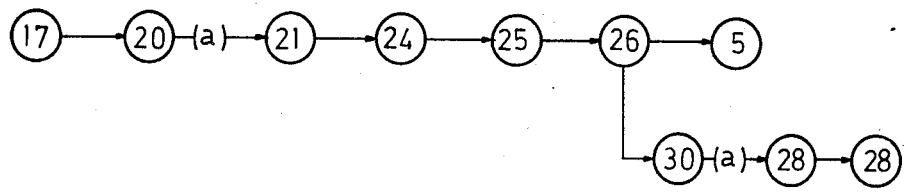
Figure 4B:
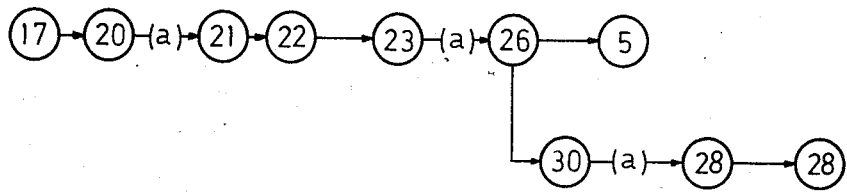
Figure 4C:
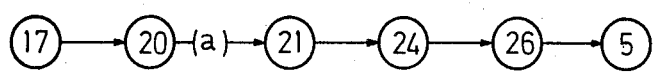
Figure 4D:
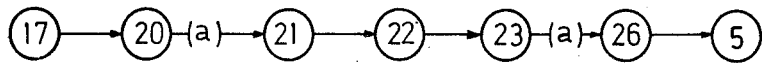

The objects and features of the present invention will be more apparent from the embodiment of the invention illustrated in the drawing, in which;

FIG. 1 is a schematic side view, partly in section, of a friction welder attached to an apparatus for optionally selecting the first thrust force or the second thrust force according to the present invention, FIG. 2 is a schematic diagram of the hydraulic or fluid circuit used in the apparatus according to the present invention, FIG. 3 is an explanatory diagram showing a relation between the thrust force applied to the workpieces and the gauge pressure of the fluid in the fluid circuit shown in FIG. 2, FIGS. 4A, 4B, 4C and 4D are explanatory diagrams showing the operation systems of the apparatus shown in FIG. 2, Referring to FIG. 1, a friction welder comprises a bed 1, a spindle head 2 mounted on the bed 1 and a rotationally driven spindle 3 rotatably supported by the spindle head 2. A slide table 4 is slidably mounted on the bed 1 and a first fluid actuator consisting a hydraulic cylinder 5 is secured to the bed 1 and is provided with a piston 6 connected with the slide table 4 by a connecting rod 7. A pair of stationary chucks 8 and 9 are mounted upon the slide table 4 and; a chuck 10 is secured to an inside terminal of the spindle 3 for releasably holding one of the workpieces which are to be frictionally welded together. The spindle 3 is driven by a belt drive mechanism comprising a pulley 11 secured to a shaft of a motor 12 disposed to the bed 1, a pulley 13 secured to an outside terminal of the spindle 3 and a belt 14 for connecting pulleys 11 and 13. A workpiece 15 is rigidly supported by the chuck 10 and the other workpiece 16 is also rigidly supported by the stationary chucks 8 and 9. Therefore, the workpiece 16 can be moved towards the workpiece 15 by the sliding motion of the slide table 4, which is actuated by the motion of the hydraulic cylinder 5, and be brought into a pressure contact with the workpiece 15 during the operation of the friction welder. The workpiece 15 and the workpiece 16 are hereinafter refer to as "the first workpiece" and "the second workpiece", respectively.

Referring to FIG. 2 showing the hydraulic circuit used in the apparatus of the present invention, an inlet of a hydraulic pump 17 is connected to a hydraulic tank or reservoir 18 and an outlet thereof comprises a source of pressurized fluid and is connected to a first solenoid selector valve 20 through a conduit 19. A conduit 21 is connected to a high pressure reducing or pressure control valve 22 for high pressure, and a second solenoid selector valve 23 is connected to the reducing valve 22. A low pressure reducing valve 24 is connected to the conduit 21 and also a third solenoid selector valve 25. A conduit 26 is connected to the second and third solenoid valves 23, 25 respectively, and a branch thereof forms a connection to a piston chamber 5a of the hydraulic cylinder 5. A second fluid actuating means comprises pair of hydraulic cylinders 28a and 28b which are mounted on the bed 1 at positions in a working side of the friction welder with regard to the slide table 4 and their pistons 27a and 27b are connected to the slide table 4 by connecting rods 29a and 29b, respectively. A fourth solenoid selector valve 30 is connected to the conduit 26 and also connected to both piston chambers 34a, 34b of the hydraulic cylinders 28a and 28b respectively. A conduit 31 is connected the other piston chambers 35a, 35b of the hydraulic cylinders 28a, 28b, respectively, and another end of the conduit 31 is connected to the first solenoid valve 20. The conduit 31 is connected to the fourth solenoid valve 30 by a circular conduit 33 and a pressure gauge 32 is connected to the conduit 26.

A method for optionally selecting the first thrust force, which is required to generate heat by the frictional contact of the workpieces, or the second thrust force, which is required to carry out the upset operation in an alternative manner is hereinafter illustrated in case of using the above-mentioned apparatus of the friction welder.

As mentioned above, it is possible to optionally select a hydraulic circuit which forms a high thrust force generating system or that of forming a low thrust force generating system in an alternative manner by means of valving means for changing over the fluid pressure of the hydraulic circuit which is connected to the above-mentioned hydraulic cylinders of the friction welder, respectively. In FIG. 3, the diagram A represents a relation between the thrust force applied to the workpieces and the gauge pressure of the hydraulic circuit which corresponds to a high thrust force generating system, while the diagram B represents that of the hydraulic circuit which corresponds to a low thrust force generating system, according to the present invention. In the present invention, the first thrust force and the second thrust force can be optionally determined in one of the above-mentioned two systems respectively, or can be optionally determined in these two systems in a combined condition.

Referring to FIGS. 2, 3, 4A and 4B, in the case of generating the first thrust force ($P_1$) and the second thrust force ($P_2$) of the high thrust force generating system or mode A, a compressed fluid is fed to the conduit 19 and then to the fluid circuit the hydraulic pump 17 of the friction welder. When the first solenoid selector valve 20 is actuated and moves to condition (a) in FIG. 2, the above-mentioned compressed fluid is fed to the pressure reducing valve 24 through the conduit 21, and next fed to the hydraulic cylinder 5 through the third solenoid valve 25 and the conduit 26, while the compressed fluid is fed from the conduit 26 through the fourth solenoid selector valve 30 which has likewise been moved to condition (a) in FIG. 2, and further fed to the piston chambers 34a and 34b of the hydraulic cylinder 28a and 28b, respectively, thereby the first thrust force ($P_1$) of the highest thrust force generating system is loaded on the second workpiece 13. (See FIG. 4A.)

Next, the second and third solenoid selector valves 23 and 25 are actuated and move to condition (a) in FIG. 2 respectively while the fourth solenoid valve 30 is maintained in a condition (a) in FIG. 2, the compressed fluid is fed to the high pressure reducing valve 22 from the conduit 21, and then fed into the piston room 5a of the hydraulic cylinder 5, while the compressed fluid is fed to the piston rooms 34a and 34b of the hydraulic cylinder 28a and 28b respectively through the conduit 26 and the fourth solenoid valve 30 maintained in a condition (a) in FIG. 2. Thus, the second thrust force ($P_2$) of the high trust force generating system is loaded on the second workpiece 13. (See FIG. 4B.)

Referring to FIGS. 2, 3, 4C and 4D, in case of generating the first thrust force and the second thrust force of the low thrust force generating system or mode B, as the second and fourth solenoid selector valves 23 and 30 are closed, the compressed fluid which is fed from the hydraulic pump 17 through the conduit 19 and the first solenoid valve 20 which is in condition (a) in FIG. 2, is fed to the hydraulic cylinder 5 through the low pressure reducing valve 24 and the third solenoid selector valve 25 and the conduit 26. Thus the first thrust force ($P'_1$) of the low thrust force generating system is loaded on the second workpiece 13. (See FIG. 4C)

Next, when the second and third solenoid selector valves 23 and 25 are changed into the condition (a) in FIG. 2, the compressed oil in the conduit 21 is fed to the hydraulic cylinder 15 through the second solenoid selector valve 23 while same is in the condition (a) in FIG. 2 and the conduit 26. Thus the second thrust force ($P'_2$) of the low thrust force generating system is loaded on the second workpiece 13. (See FIG. 4D.)

In the above-mentioned cases for generating the first and second thrust force ($P'_1$) and ($P'_2$), the compressed fluid in the piston chambers 35a and 35b of the respective hydraulic cylinders 28a and 28b is circulated to the piston chambers 34a and 34b of the respective oil hydraulic cylinders 28a and 28b through the conduit 31 and the circular conduit 33.

When it is required to combine the above-mentioned low and high thrust force generating systems, it is possible to combine the system for generating the first thrust force ($P'_1$) of the low thrust force generating system (See FIG. 4C.) with the system for generating the second thrust force ($P_2$) of the high thrust force generating system (See FIG. 4B) to obtain a combined high-low or A-B mode of operation.

As mentioned above in detail, the apparatus of the present invention has a unique feature that the thrust force applied to the workpieces can be optionally selected as the first thrust force ($P_1$) or ($P'_1$), the second thrust force ($P_2$) or ($P'_2$) in order to apply a preferable pressure in accordance with the quality of material of these workpieces, by means of applying the optional control of the fluid pressure circuit provided with the fluid pressure control elements such as the first, second, third and fourth solenoid selector valves 20, 23, 25 and 30 which actuate the hydraulic cylinders 5, 28a and 28b respectively by the compressed fluid supplied from the single supply source of pressure fluid.

Obviously many modifications and variations concerning this invention are possible in the light of the above teachings. It is, therefore, to be understood that this invention may be practised otherwise than as described.

What is claimed is:

1. A friction welding apparatus comprising: rotatable means for releasably holding and rotating a first workpiece; a movably mounted slide member having means thereon for releasably holding a second workpiece; means mounting said slide member for translational movement towards and away from said rotatable means to effect alignment of and pressure contact between the first and second workpieces; first actuating means connected to said slide member responsive to pressurized fluid supplied thereto actuate said slide member; second actuating means connected to said slide member responsive to pressurized fluid supplied thereto to actuate said slide member; and a fluid circuit having means alternatively operable in a low pressure mode to sequentially supply pressurized fluid in an initial stage at one pressure level and then pressurized fluid in a final stage at another pressure level higher than said one pressure level to an exhaust fluid from said first actuating means to actuate same and accordingly move said slide member to sequentially effect pressure contact between said first and second workpieces at two different pressure levels, operable in a high pressure mode to sequentially supply pressurized fluid in an initial stage at said one pressure level and then pressurized fluid in a final stage at said another pressure level concurrently to and exhaust fluid concurrently from both said first and second actuating means to concurrently actuate same and accordingly move said slide member to sequentially effect pressure contact between said first and second workpieces at two different pressure levels each of which is higher than its corresponding pressure level in said low pressure mode, and operable in a combined high-low pressure mode to sequentially supply pressurized fluid in an initial stage at said one pressure level to said actuating means in accordance with the initial stage of one of said low and high pressure modes and then pressurized fluid in a final stage at said another pressure level to said actuating means in accordance with the final stage of the other of said low and high pressure modes to sequentially effect pressure contact between said first and second workpieces at two different pressure levels each of which corresponds to one of the stages in one of said low and high pressure modes.

2. An apparatus according to claim 1, wherein said fluid circuit comprises a reservoir receptive during use of the apparatus of a working fluid, a pump having an inlet connected to said reservoir and an outlet for delivering therefrom pressurized fluid, converting means in fluid communication with the pump outlet for selectively converting the pressurized fluid into one source of pressurized fluid maintained at said one pressure level and another source of pressurized fluid maintained at said another pressure level, and valving means for alternatively valving the flow of pressurized fluid from said one source of pressurized fluid to only said first actuating means or concurrently to said first and second actuating means and alternatively valving the flow of pressurized fluid from said another source of pressurized fluid to only said first actuating means or concurrently to said first and second actuating means.

3. An apparatus according to claim 2, wherein said valving means comprises conduit means communicating each of said first and second actuating means with each of said one and another sources of pressurized fluid and with said reservoir, and a plurality of selector valves disposed within said conduit means comprising a first selector valve selectively operable to communicate said source of pressurized fluid with said converting means, a second selector valve selectively operable to communicate said another source of pressurized fluid with said first actuating means, a third selector valve selectively operable to communicate said one source of pressurized fluid with said first actuating means, and a fourth selector valve selectively operable independently of the other selector valves to communicate said second actuating means with both said second and third selector valves to provide communication between said second actuating means and said one and another sources of pressurized fluid.

4. An apparatus according to claim 3, wherein said converting means comprises a first pressure reducing valve in communication with the pump output effective to reduce the pressure of the pressurized fluid and convert same into said one source of pressurized fluid maintained at said one pressure level, and a second pressure reducing valve in communication with the pump output effective to reduce the pressure of the pressurized fluid and convert same into said another source of pressurized fluid maintained at said another level.

5. An apparatus according to claim 2, wherein said converting means comprises a first fluid pressure reducing valve in communication with the pump output effective to reduce the pressure of the pressurized fluid and convert same into said one source of pressurized fluid maintained at said one pressure level, and a second pressure reducing valve in communication with the pump output effective to reduce the pressure of the pressurized fluid and convert same into said another source of pressurized fluid maintained at said another level.

6. An apparatus according to claim 2, wherein said second actuating means comprises a pair of fluid motors each comprising a cylinder and a piston mounted for reciprocal movement within said cylinder and connected to said slide member, and means providing communication between said pair of cylinders on both sides of their respective pistons.

* * * * *